US009948156B2

(12) United States Patent
Anderson et al.

(10) Patent No.: US 9,948,156 B2
(45) Date of Patent: Apr. 17, 2018

(54) LAWN MOWER MOTOR AND DRIVE

(71) Applicant: Moog Inc., East Aurora, NY (US)

(72) Inventors: Troy A. Anderson, Blacksburg, VA (US); Ronald Flanary, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 203 days.

(21) Appl. No.: 14/768,475

(22) PCT Filed: Mar. 14, 2014

(86) PCT No.: PCT/US2014/027149
§ 371 (c)(1),
(2) Date: Aug. 18, 2015

(87) PCT Pub. No.: WO2014/152273
PCT Pub. Date: Sep. 25, 2014

(65) Prior Publication Data
US 2015/0381009 A1 Dec. 31, 2015

Related U.S. Application Data

(60) Provisional application No. 61/787,055, filed on Mar. 15, 2013.

(51) Int. Cl.
*H02K 5/15* (2006.01)
*A01D 34/00* (2006.01)
*H02K 11/33* (2016.01)
*H02K 7/14* (2006.01)

(52) U.S. Cl.
CPC ............... *H02K 5/15* (2013.01); *A01D 34/00* (2013.01); *H02K 11/33* (2016.01); *H02K 7/14* (2013.01)

(58) Field of Classification Search
CPC .. H02K 2211/03; H02K 5/15; H02K 11/0094; A01D 34/00
See application file for complete search history.

(56) References Cited

U.S. PATENT DOCUMENTS 4,835,405 A    5/1989  Clancey et al.
5,334,897 A *  8/1994  Ineson ..................... H02K 5/08
                                              310/401

(Continued)

FOREIGN PATENT DOCUMENTS

EP              1414140 A1    4/2004

*Primary Examiner* — Mohamad Musleh
(74) *Attorney, Agent, or Firm* — Hodgson Russ LLP

(57) ABSTRACT

A combined d.c. brushless motor and drive control assembly for a rotary mower includes a hollow motor housing, a cover removably attached to an open rear end of the housing, and an end shield mounted to an internal shelf of the housing adjacent its rear end. The end shield and a front wall of the housing define rotary bearing seats for a motor drive shaft. An electronic circuit board including motor drive electronics and feedback sensors is mounted to the housing or to the cover, and is positioned at an axial location between the internal shelf of the housing and the rear wall of the cover. The housing is configured for mounting on a shroud of the rotary mower such that at least the removable cover is above the shroud and easily accessible, whereby repair or replacement of the electronic circuit board is facilitated.

12 Claims, 11 Drawing Sheets

(56) References Cited

U.S. PATENT DOCUMENTS

| | | |
|---|---|---|
| 5,394,043 A * | 2/1995 | Hsia .................. H02K 3/44 |
| | | 310/156.08 |
| 5,610,458 A | 3/1997 | Baker et al. |
| 5,691,584 A | 11/1997 | Toida et al. |
| 6,081,056 A | 6/2000 | Takagi et al. |
| 6,995,494 B2 | 2/2006 | Haugan |
| 7,707,812 B2 | 5/2010 | Cheung |
| 7,958,712 B2 | 6/2011 | Cheung |
| 8,227,948 B1 | 7/2012 | Fox et al. |
| 8,373,323 B2 | 2/2013 | Tang et al. |
| 8,643,231 B2 | 2/2014 | Flanary |
| 2005/0005588 A1 | 1/2005 | Jager |
| 2006/0061224 A1 | 3/2006 | Mullin et al. |
| 2011/0120073 A1 | 5/2011 | Flanary |
| 2012/0104983 A1 | 5/2012 | Tanimoto et al. |

\* cited by examiner

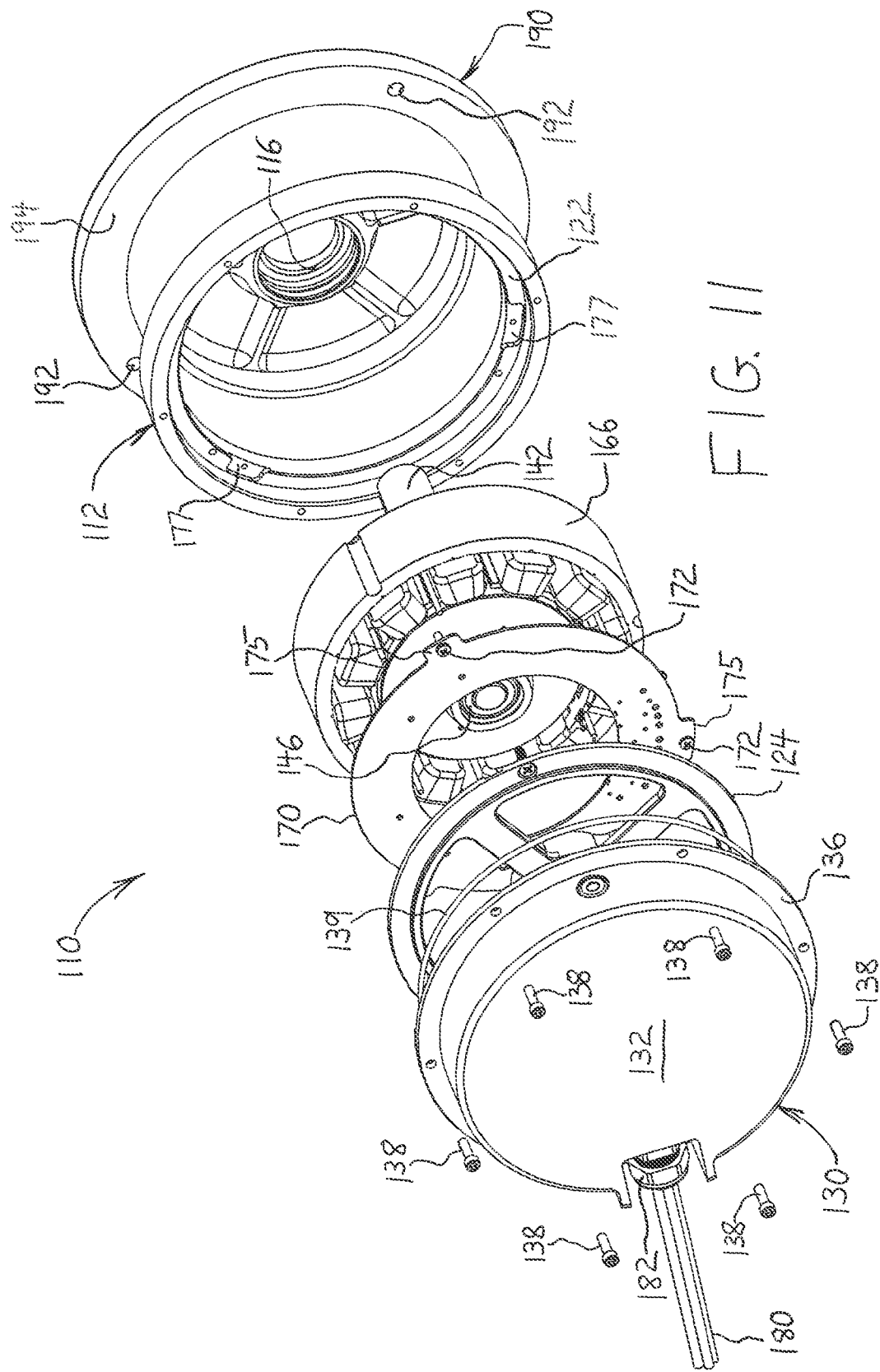

of the hollow housing. The drive circuit may be programmed or configured to adjust the speed at which the motor is running, and may also be programmed to sense unusual load patterns associated with cutting thick grass and react quickly to maintain a desired rpm. A lawn mower incorporating the motor can be commanded to stop, temporarily reduce speed, and/or communicate externally to a mower traction system to slow down through a heavy load area. For safety, an emergency stop ("e-stop") control may be provided to stop the motor nearly instantaneously. The microprocessor or microcontroller may be programmed and configured to provide a controller area network bus ("CAN-BUS") or another message-based protocol, whereby the lawn mower may be capable of network communications to report status and/or accept commands and control upgrades.

The hollow housing includes a radially protruding mounting structure having a plurality of fastener-receiving holes, whereby the motor assembly may be mounted to the shroud of a lawn mower. In one embodiment, the mounting structure is located proximate the open rear end of the housing, such that the brushless motor will reside below the mower shroud and the circuit board will reside above the shroud when the motor assembly is mounted on the mower shroud. In another embodiment, the mounting structure is located proximate a front end wall of the hollow housing, such that all or substantially all of the motor assembly remains above the mower shroud. The mounting structure may be embodied as a plurality of tabs or as a continuous flange.

LAWN MOWER MOTOR AND DRIVE

CROSS-REFERENCE TO RELATED APPLICATIONS

This application is a national stage application of international patent application PCT/US14/27149, filed on Mar. 14, 2014, which claims priority to U.S. Provisional Application No. 61/787,055, filed on Mar. 15, 2013, the disclosures of which is are incorporated herein by reference.

FIELD OF THE INVENTION

The present invention relates generally to brushless direct current motors.

BACKGROUND OF THE INVENTION

Lawn mowers employing a blade that rotates about a vertical axis are known as rotary mowers. Rotary mowers may be powered by a gasoline-fueled combustion engine or by an electric motor connected to rotate a shaft to which the cutting blade is attached. For safety reasons, the blade is contained within a downwardly open shroud. The combustion engine or electric motor may also provide power to wheels of the mower to assist on propelling the mower over ground, however a common arrangement on electric powered mowers for residential lawns is for the electric motor to power the rotary blade while the operator pushes the mower along the ground.

Electric motors typically require a motor drive, i.e. an electronic controller, for sensing rotation of the motor's rotor and for driving the motor at a suitable rpm. The motor drive may be embodied by circuitry and components, such as Hall effect sensors, mounted on a circuit board. In order to service the mower, it may be necessary to verify connection of the motor drive to a power source, or to repair or replace the motor drive. In this regard, it is desirable that the motor drive be serviceable without having to remove the entire motor from the shroud.

In some rotary mowers, grass is conveyed through a chute to a collection bag located between the push handle and the shroud. Therefore, if an electric motor is used to power the rotary blade, it is desirable to minimize the space occupied by the motor above the shroud.

SUMMARY OF THE INVENTION

The invention provides a motor assembly for a rotary lawn mower wherein the motor assembly incorporates both a d.c. brushless motor and motor drive electronics in the same housing assembly. The motor drive electronics, which may include a microprocessor or microcontroller and feedback sensors, are provided on a circuit board that is accessible through a removable cover of the motor assembly situated above the a blade shroud of the mower.

The motor assembly comprises hollow housing in which the motor resides and through which a drive shaft of the motor protrudes, an end shield mounted to an internal shelf of the housing, and a cover removably attached to an open rear end of the housing. The electronic circuit board is mounted to the housing or to the cover, and is positioned at an axial location between the internal shelf of the housing and a rear wall of the cover.

In one embodiment, the electronic circuit board is mounted to an underside of the cover. In another embodiment, the electronic circuit board is mounted to the internal

BRIEF DESCRIPTION OF THE DRAWING VIEWS

The nature and mode of operation of the present invention will now be more fully described in the following detailed description of the invention taken with the accompanying drawing figures, in which:

FIG. 11 is another exploded view of the motor assembly shown in FIG. 7.

DETAILED DESCRIPTION OF THE INVENTION

FIGS. 1-6 depict a motor assembly 10 formed in accordance with a first embodiment of the present invention.

Motor assembly 10 is designed for use in a rotary lawn mower to drive rotation of a rotary blade of the mower. However, motor assembly 10 may have other uses and applications beyond lawn mowers.

Figure 1:
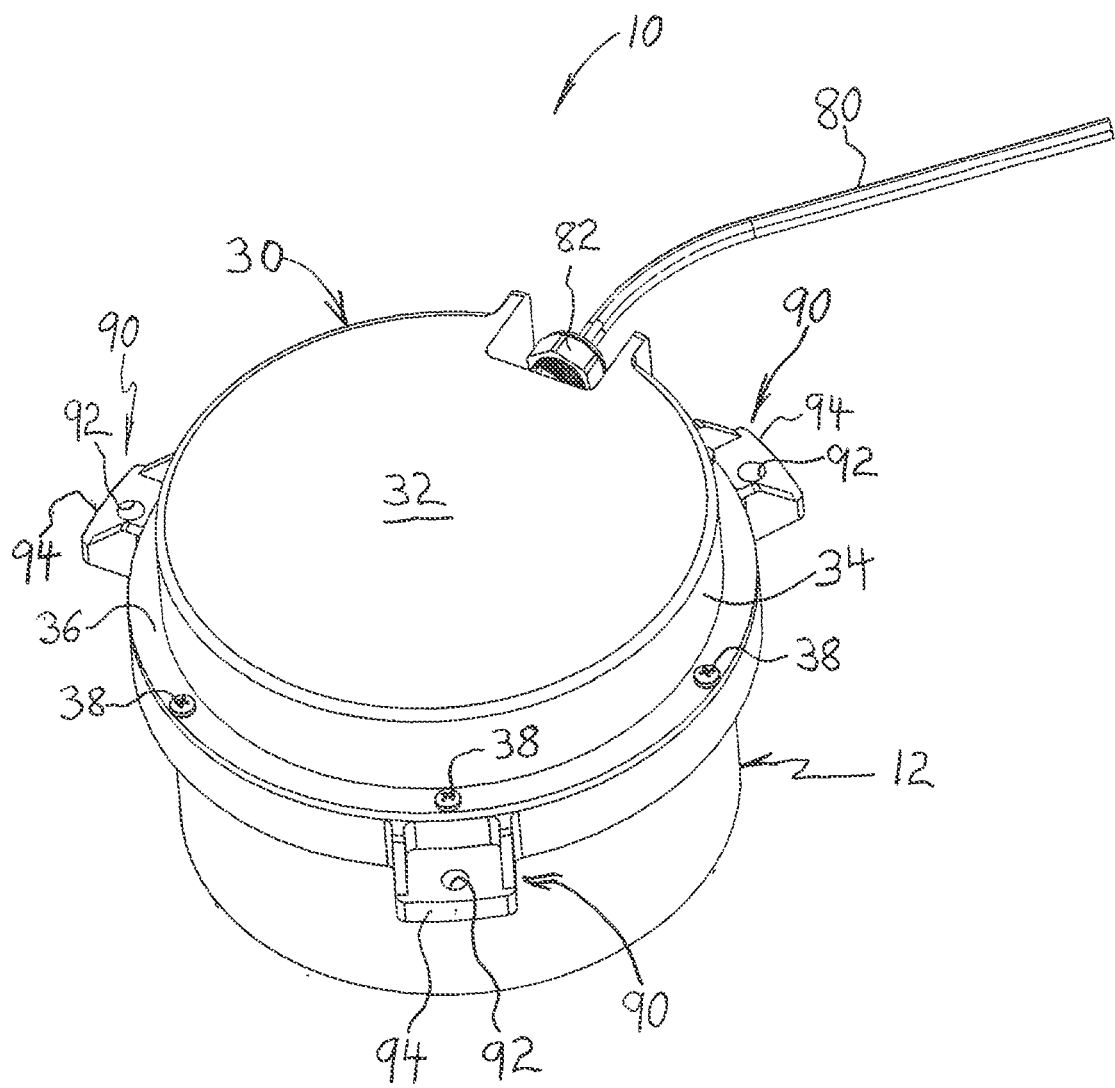
FIG. 1 is a perspective view of a motor assembly formed in accordance with a first embodiment of the present invention.
Figure 2:
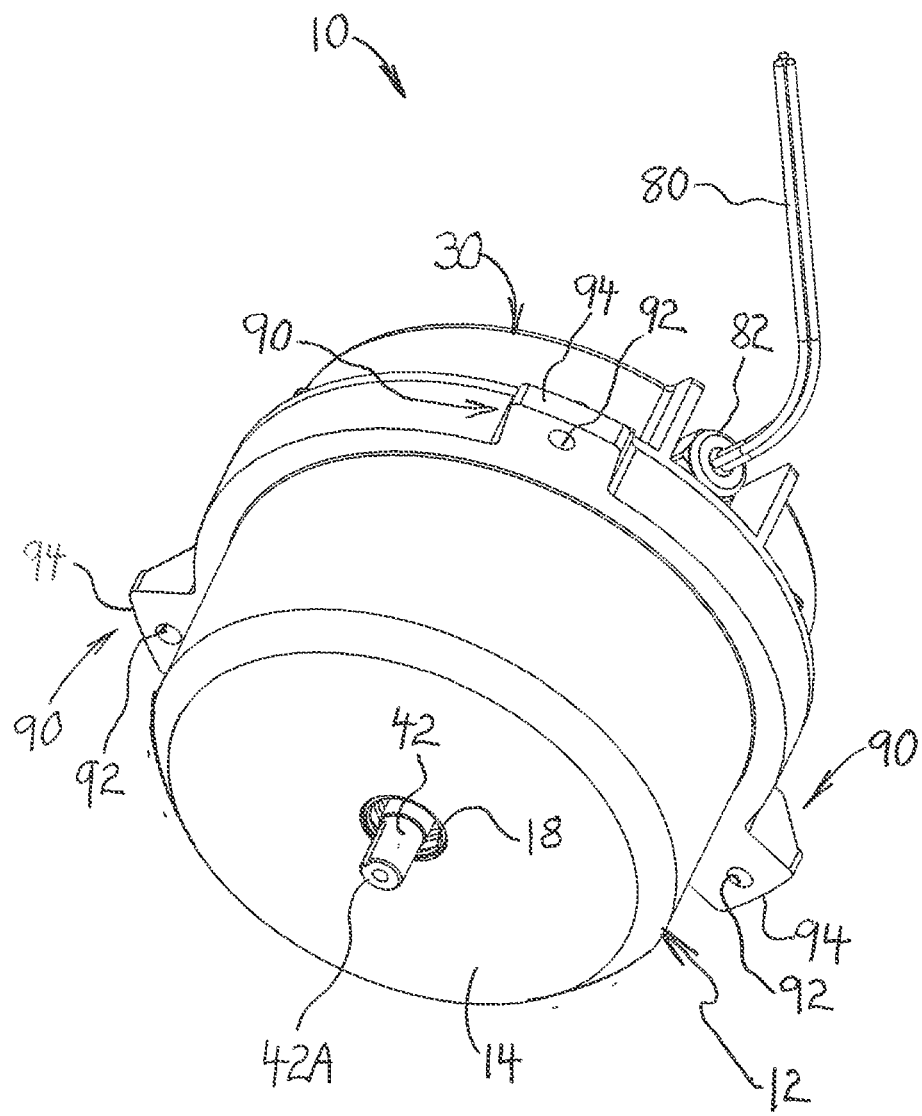
FIG. 2 is another perspective view of the motor assembly shown in FIG. 1.
Figure 3:
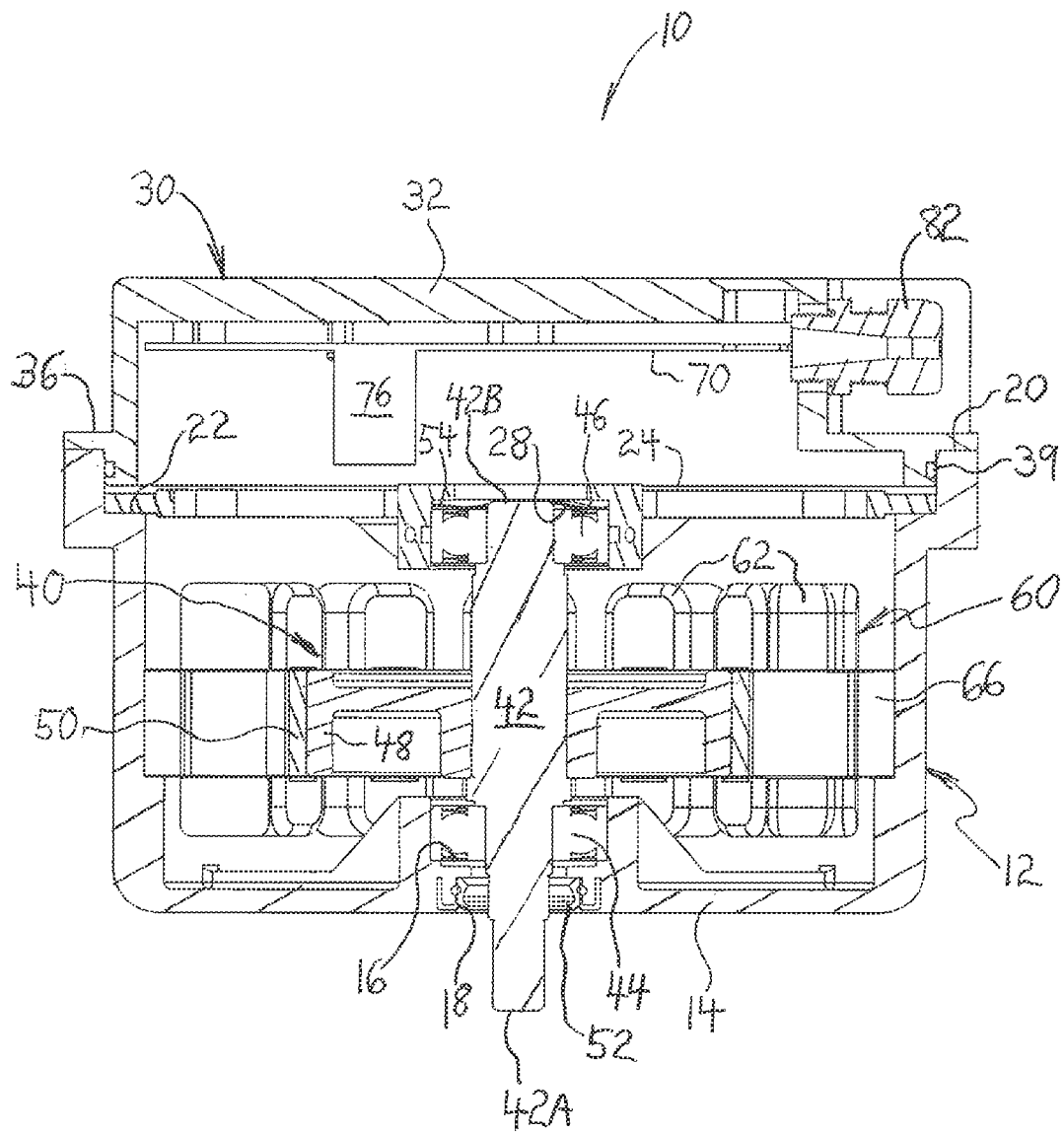
FIG. 3 is a longitudinal cross-sectional view of the motor assembly shown in FIG. 1.
Figure 4:
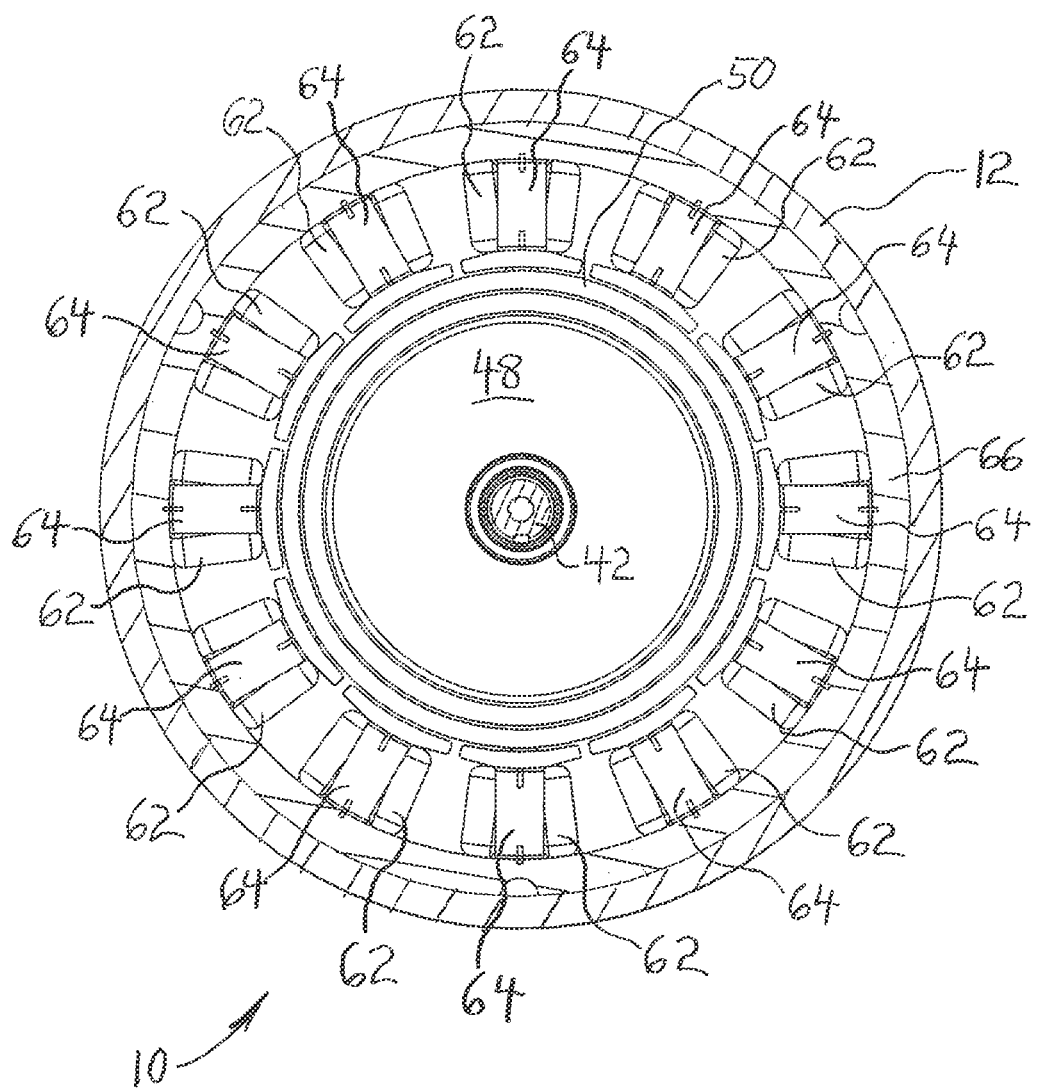
FIG. 4 is a transverse cross-sectional view of the motor assembly shown in FIG. 1, illustrating structure of the rotor and stator of the motor assembly.
Figure 5:
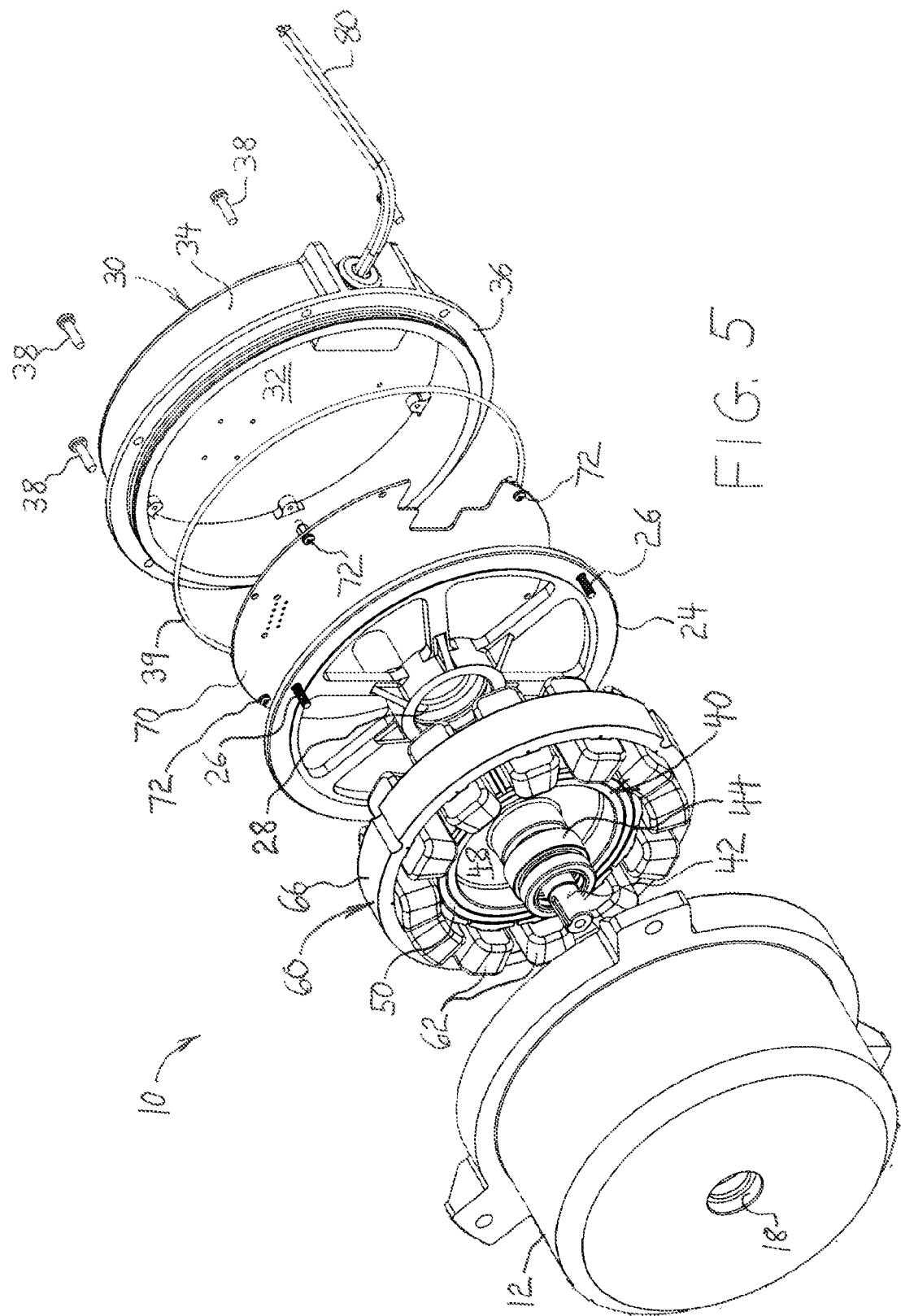
FIG. 5 is an exploded view of the motor assembly shown in FIG. 1.
Figure 6:
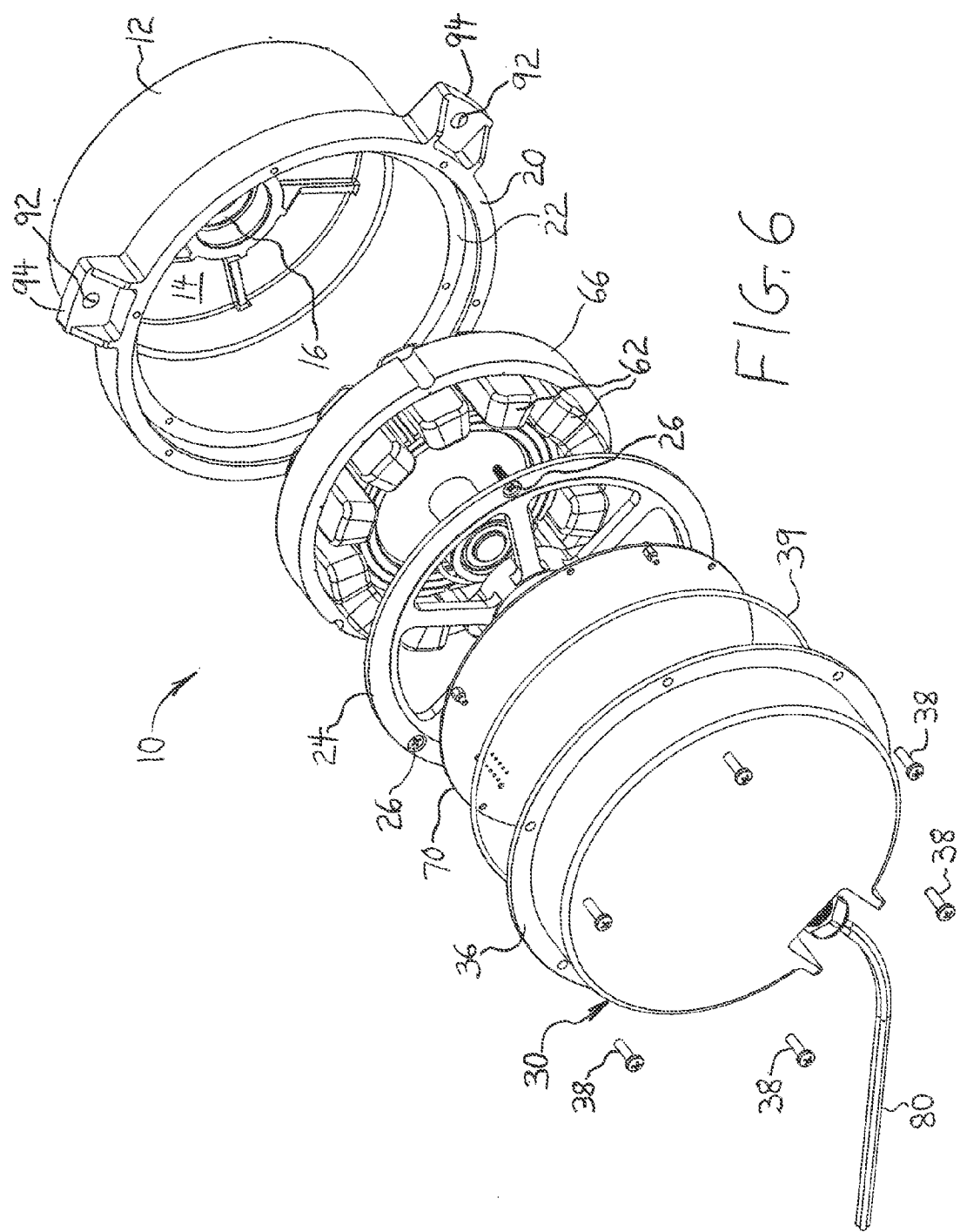
FIG. 6 is another exploded view of the motor assembly shown in FIG. 1.
Figure 7:
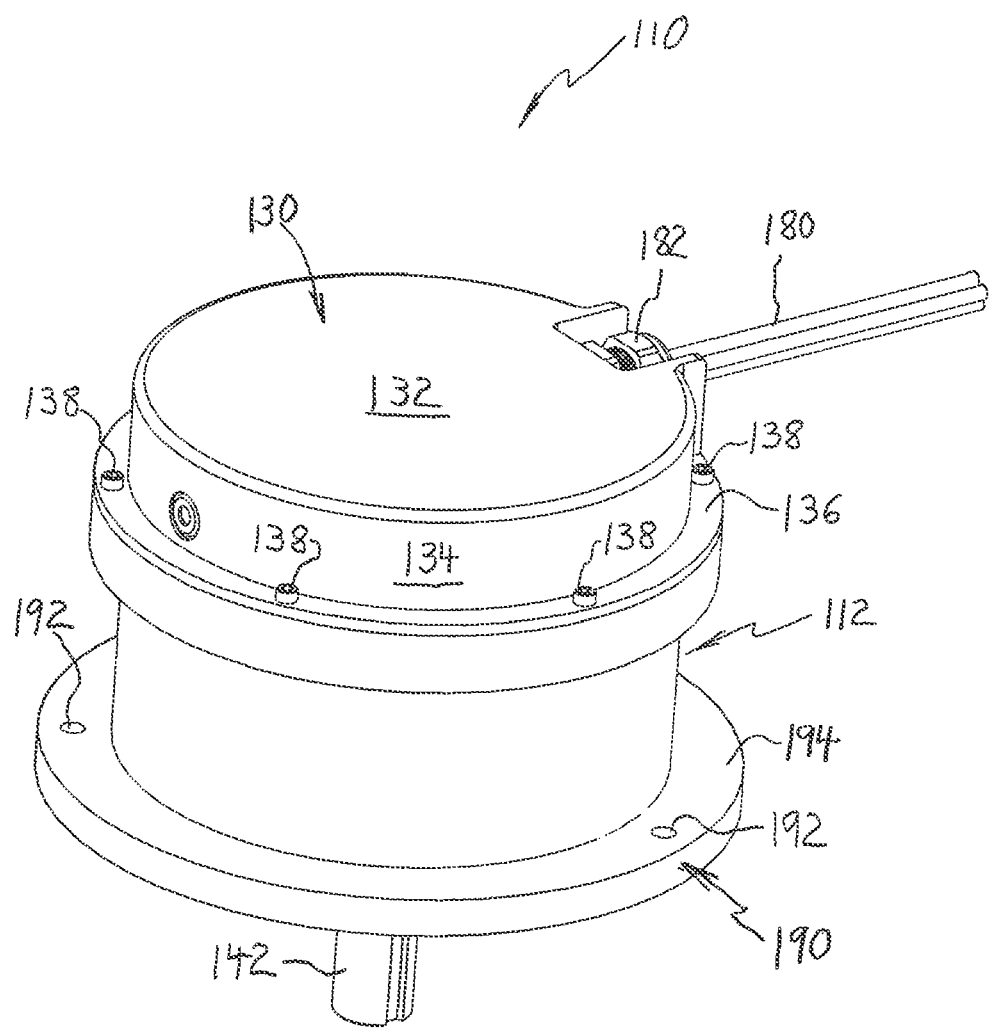
FIG. 7 is a perspective view of a motor assembly formed in accordance with a second embodiment of the present invention.

Motor assembly 10 comprises a hollow housing 12 that includes a front end wall 14 defining a forward bearing seat 16 and a shaft aperture 18. Housing 12 further includes an open rear end 20 and an internal shelf 22 adjacent open rear end 20. Motor assembly 10 also comprises an end shield 24 which may be mounted to internal shelf 22 by threaded fasteners 26. End shield 24 defines a rearward bearing seat 28. Motor assembly 10 further comprises a cover 30 removably attached to the open rear end 20 of housing 12. Cover 30 includes a rear wall 32, a circumferential wall 34, and a flange 36. Cover 30 may be arranged with flange 36 flush against rear end 20 of housing 12 and removably attached to housing 12 by threaded fasteners 38. As best seen in FIG. 3, a lower portion of cover 30 may extend into the open end of housing 12 such that the housing and cover define radially inner and outer facing surfaces, and an O-ring 39 may be positioned in a circumferential groove to form a seal between the facing surfaces of the housing and the cover.

Internal components of motor assembly 10 will now be described with particular reference to FIGS. 3-6.

A rotor 40 including a rotor shaft 42 having a front end 42A and a rear end 42B is arranged in housing 12 such that rotor shaft 42 extends in an axial direction through the shaft aperture 18, whereby front end 42A of the rotor shaft is outside the housing 12. A first rotary bearing 44 is seated in forward bearing seat 16 and a second rotary bearing 46 is seated in rearward bearing seat 28, wherein the first and second bearings 44, 46 rotatably support rotor shaft 42 for rotation relative to housing 12 and end shield 24. Rotor 40 includes a hub 48 fixed to rotate with rotor shaft 42. Hub 48 carries a ring magnet 50. A collar 52 may be arranged adjacent shaft aperture 18. A spring washer 54 may be arranged between second rotary bearing 46 and the rearward bearing seat 28 of end shield 24.

A stator assembly 60 is positioned in housing 12 and may be energized to drive rotation of rotor 40. Stator assembly 60 includes a plurality of windings 62 arranged circumferentially about ring magnet 50 of rotor 40. By way of non-limiting example, the stator assembly depicted in FIG. 4 has twelve windings 62 angularly spaced about rotor 40. Windings 62 are wound around radial fingers 64 of a laminated stator core 66. The stator core 66 is keyed within housing 12 so as to prevent its rotation.

Motor assembly 10 includes an integrated motor drive circuit. The drive circuit is embodied in an electronic circuit board 70 positioned in motor assembly 10 at an axial location between the internal shelf 22 of housing 12 and rear wall 32 of cover 30. In the embodiment of FIGS. 1-6, electronic circuit board 70 is mounted to rear wall 32 of cover 30 by threaded fasteners 72. Electronic circuit board 70 may include a microprocessor or microcontroller and Hall effect sensors (not shown) which provide feedback signals indicating the rotational position of rotor 40 for use in motor commutation. Electronic circuit board 70 may also include one or more capacitors 76. A motor lead bundle 80 includes individual motor leads which may extend through a radial hole in cover 30 for connection to electronic circuit board 70. Motor lead bundle 80 and the associated lead connections may be protected by a strain relief device 82.

The drive circuit may be programmed or configured to adjust the speed at which motor assembly 10 is running. The drive circuit may also be programmed to sense unusual load patterns, as may result when the mower blade encounters very thick grass, and react to them quickly to maintain a desired rpm. A lawn mower incorporating motor assembly 10 can be commanded to stop, temporarily reduce speed, and/or communicate externally to a mower traction system to slow down due to a heavy load area. For safety, an emergency stop ("e-stop") control may be provided to stop the motor nearly instantaneously, e.g. in a fraction of a second.

The microprocessor or microcontroller may be programmed and configured to provide a CANBUS communications protocol or another message-based protocol. A lawn mower using motor assembly 10 may therefore be capable of network communications to report status and/or accept commands for a manufacturer or user to improve coordinated actions or to aid in debugging. A lawn mower using motor assembly 10 may therefore be reprogrammed in the field. Implementation of a CANBUS protocol is advantageous for providing automated robotic lawn mowers.

Returning now to FIGS. 1-2, housing 12 includes a radially protruding mounting structure 90 having a plurality of fastener-receiving holes 92, whereby the housing 12 may be mounted to a shroud of a lawn mower. In the first embodiment, the radially protruding mounting structure 90 is in the form of a plurality of radially extending tabs 94 arranged proximate the open rear end 20 of housing 12. As may be understood, motor assembly 10 may be mounted on a mower shroud such that most of the motor assembly is located under the shroud, but the cover 30 is located above the mower shroud. This arrangement reduces the space above the shroud occupied by motor assembly 10, yet also allows easy access to electronic circuit board 70 through removal of cover 30 from above the mower shroud for repair or replacement of the motor drive circuitry.

FIGS. 7-11 show a motor assembly 110 formed in accordance with a second embodiment of the present invention. Like motor assembly 10 of the first embodiment, motor assembly 110 is designed for use in a rotary lawn mower to drive rotation of a rotary blade of the mower, but may have other uses and applications beyond lawn mowers.

Figure 8:
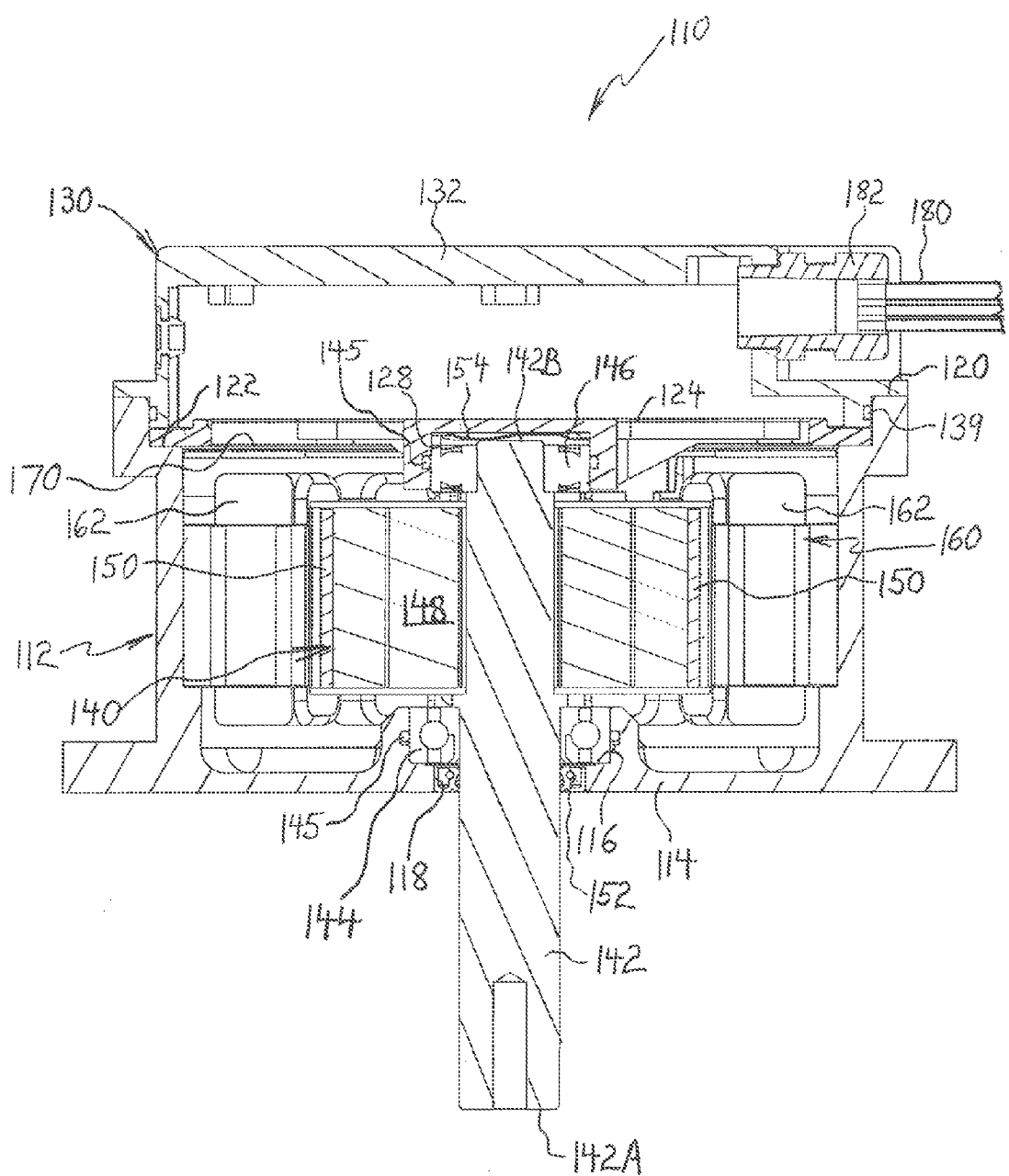
FIG. 8 is a longitudinal cross-sectional view of the motor assembly shown in FIG. 7.
Figure 9:
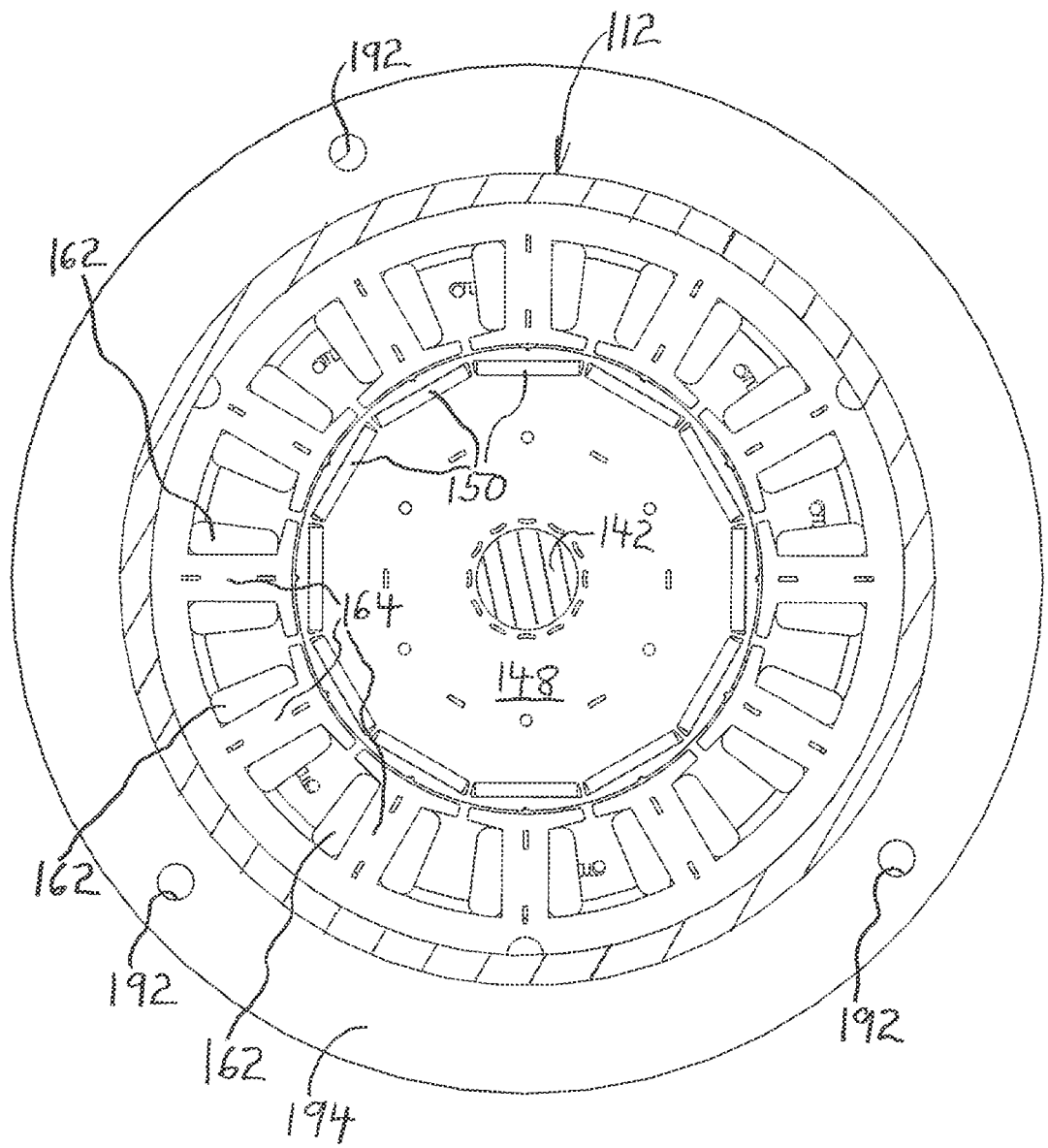
FIG. 9 is a transverse cross-sectional view of the motor assembly shown in FIG. 7, illustrating structure of the rotor and stator of the motor assembly.
Figure 10:
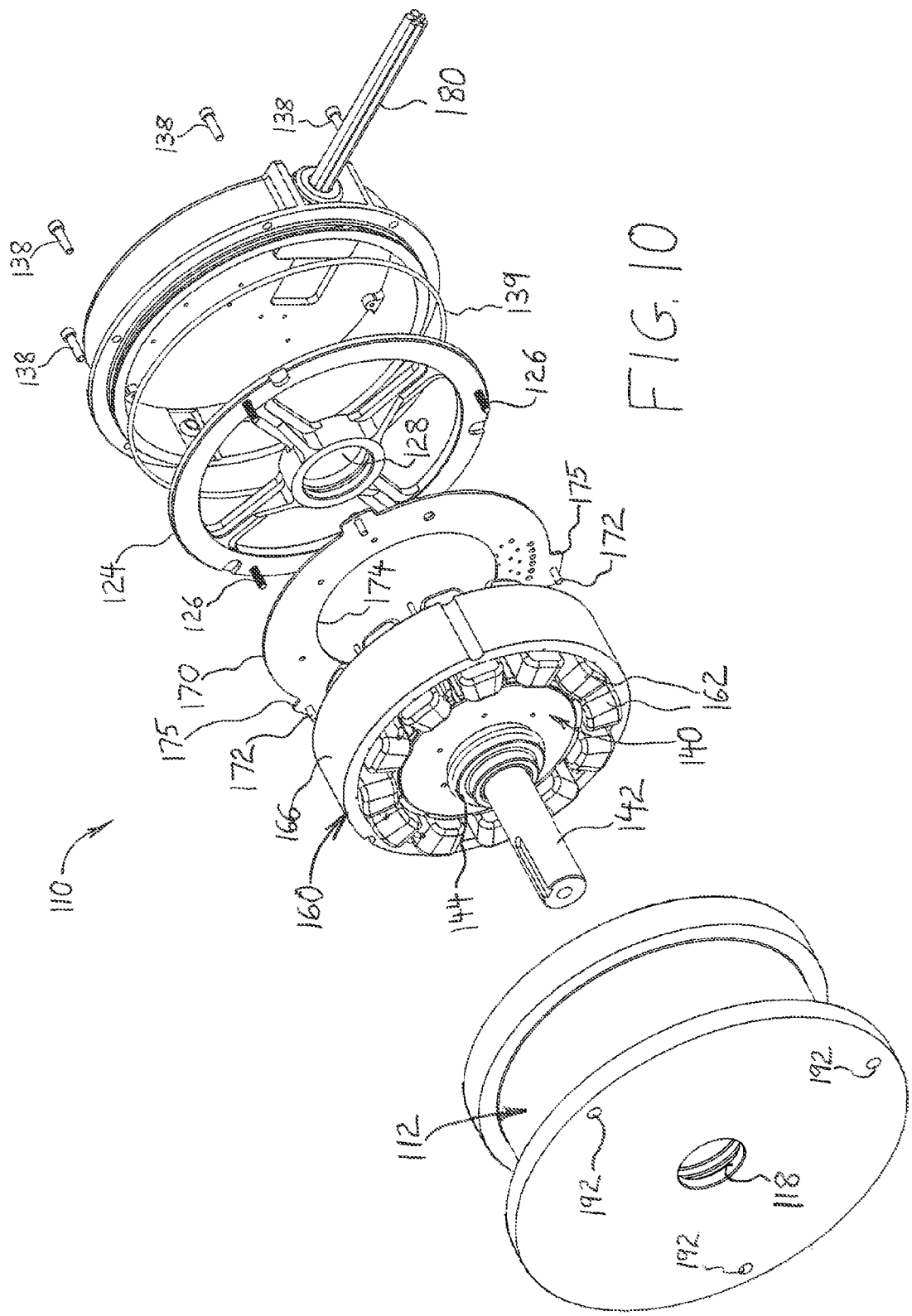
FIG. 10 is an exploded view of the motor assembly shown in FIG. 7.

Motor assembly 110 comprises a hollow housing 112 that includes a front end wall 114 defining a forward bearing seat 116 and a shaft aperture 118. Housing 112 further includes an open rear end 120 and an internal shelf 122 adjacent open rear end 120. Motor assembly 110 also comprises an end shield 124 which may be mounted to internal shelf 122 by threaded fasteners 126. End shield 124 defines a rearward bearing seat 128. Motor assembly 110 further comprises a cover 130 removably attached to the open rear end 120 of housing 112. Cover 130 includes a rear wall 132, a circumferential wall 134, and a flange 136. Cover 130 may be arranged with flange 136 flush against rear end 120 of housing 112 and removably attached to housing 112 by threaded fasteners 138. As best seen in FIG. 8, a lower portion of cover 130 may extend into the open end of housing 112 such that the housing and cover define radially inner and outer facing surfaces, and an O-ring 139 may be positioned in a circumferential groove to form a seal between the facing surfaces of the housing and the cover.

Internal components of motor assembly 110 will now be described with particular reference to FIGS. 8-11.

A rotor 140 including a rotor shaft 142 having a front end 142A and a rear end 142B is arranged in housing 112 such that rotor shaft 142 extends in an axial direction through the shaft aperture 118, whereby front end 142A of the rotor shaft is outside the housing 12. A first rotary bearing 144 is seated in forward bearing seat 116 and a second rotary bearing 146 is seated in rearward bearing seat 128, wherein the first and second bearings 144, 146 rotatably support rotor shaft 142 for rotation relative to housing 112 and end shield 124. O-rings 145 may be arranged around rotary bearings 144, 146 to dampen vibration and provide a fluid seal. Rotor 140 includes a hub 148 fixed to rotate with rotor shaft 142. Hub 148 carries a plurality of buried pole magnets 150 angularly spaced about a rotational axis of rotor shaft 142. A collar 152 may be arranged adjacent shaft aperture 118. A spring washer 154 may be arranged between second rotary bearing 146 and the rearward bearing seat 128 of end shield 124.

A stator assembly 160 is positioned in housing 112 and may be energized to drive rotation of rotor 140. Stator assembly 160 includes a plurality of windings 162 arranged circumferentially about the pole magnets 150 of rotor 140. As a non-limiting example, the stator assembly 160 depicted in FIG. 9 has twelve windings 162 angularly spaced about rotor 140. Windings 162 are wound around radial fingers 164 of a laminated stator core 166. The stator core 166 is keyed within housing 112 so as to prevent its rotation.

Like motor assembly 10 of the first embodiment, motor assembly 110 of the second embodiment includes an integrated motor drive circuit. The drive circuit is embodied in an electronic circuit board 170 positioned in motor assembly 110 at an axial location between the internal shelf 122 of housing 112 and rear wall 132 of cover 130. In the embodiment of FIGS. 7-11, electronic circuit board 70 is a ring-shaped board mounted to internal shelf 122 of housing 112 by threaded fasteners 172. Circuit board 170 includes a central opening 174 through which the rearward bearing seat 128 extends. Circuit board 170 may include radial tabs 175 sized for receipt in recesses 177 provided at angular positions around shelf 122. Electronic circuit board 170 may include a microprocessor or microcontroller and Hall effect sensors (not shown) which provide feedback signals indicating the rotational position of rotor 140 for use in motor commutation. The microprocessor or microcontroller may be programmed as described above in connection with the first embodiment. A motor lead bundle 180 includes individual motor leads which may extend through a radial hole in cover 130 for connection to electronic circuit board 170. Motor lead bundle 180 and the associated lead connections may be protected by a strain relief device 182.

Similar to the first embodiment, housing 112 of the second embodiment includes a radially protruding mounting structure 190 having a plurality of fastener-receiving holes 192, whereby the housing 12 may be mounted to a shroud of a lawn mower. However, the radially protruding mounting structure 190 is in the form of a continuous circumferential flange 194, and it is located proximate the front end wall 114 of the housing of housing 112. As may be understood, motor assembly 110 may be mounted on a mower shroud such that all or substantially all of the motor assembly 110 is located above the mower shroud, including removable cover 130. This arrangement enables easy access to electronic circuit board 170 through removal of cover 130 and end shield 124 from above the mower shroud for repair or replacement of the motor drive circuitry.

The present invention provides a motor assembly suitable for mounting on a shroud of a rotary lawn mower for powering rotary motion of a mower blade below the shroud about a vertical axis. The motor assembly incorporates drive circuit electronics in a manner that facilitates repair and replacement thereof. Motor control options and upgrades are possible in a simple manner through reprogramming the motor control software.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A motor assembly comprising:
 a hollow housing including a front end wall defining a forward bearing seat and a shaft aperture, the housing further including an open rear end and an internal shelf adjacent the open rear end;
 an end shield mounted to the internal shelf, the end shield defining a rearward bearing seat;
 a cover removably attached to the open rear end of the housing, the cover including a rear wall;
 a rotor including a rotor shaft having a front end and a rear end, wherein the rotor shaft extends in an axial direction through the shaft aperture such that the front end of the rotor shaft is outside the housing;
 a first rotary bearing seated in the forward bearing seat and a second rotary bearing seated in the rearward bearing seat, wherein the first and second bearings rotatably support the rotor shaft;
 a stator assembly positioned in the housing; and
 an electronic circuit board mounted to the housing or to the cover, wherein the circuit board is positioned at an axial location between the internal shelf of the housing and the rear wall of the cover.

2. The motor assembly according to claim 1, wherein the circuit board is mounted to the cover.

3. The motor assembly according to claim 2, wherein the circuit board is mounted to the rear wall of the cover.

4. The motor assembly according to claim 1, wherein the circuit board is mounted to the housing.

5. The motor assembly according to claim 4, wherein the circuit board is mounted to the internal shelf of the housing.

6. The motor assembly according to claim 5, wherein the circuit board includes a central opening through which the rearward bearing seat extends.

7. The motor assembly according to claim 1, wherein the housing and cover cooperate to define radially inner and outer facing surfaces, and the motor assembly further comprises and an O-ring forming a seal between the facing surfaces of the housing and the cover.

8. The motor assembly according to claim 1, wherein the housing includes a radially protruding mounting structure having a plurality of fastener-receiving holes, whereby the motor assembly may be mounted to a shroud of a lawn mower.

9. The motor assembly according to claim 8, wherein the radially protruding mounting structure is proximate the open rear end of the housing.

10. The motor assembly according to claim 8, wherein the radially protruding mounting structure is proximate the front end wall of the housing.

11. The motor assembly according to claim 8, wherein the radially protruding mounting structure includes a plurality of radially extending tabs.

12. The motor assembly according to claim 8, wherein the radially protruding mounting structure includes a circumferential flange.

* * * * *